UNITED STATES PATENT OFFICE.

VIGGO DREWSEN, OF BROOKLYN, NEW YORK, ASSIGNOR TO WEST VIRGINIA PULP & PAPER COMPANY, OF NEW YORK, N. Y., A CORPORATION OF DELAWARE.

PROCESS FOR THE PRODUCTION OF ACETATES FROM WASTE SODA LIQUORS, &c.

1,298,478. Specification of Letters Patent. Patented Mar. 25, 1919.

No Drawing. Application filed August 19, 1916, Serial No. 115,886. Renewed November 22, 1917. Serial No. 239,662.

*To all whom it may concern:*

Be it known that I, VIGGO DREWSEN, a citizen of the United States, and resident of the borough of Brooklyn, county of Kings, city and State of New York, have made a certain new and useful Invention Relating to Processes for the Production of Acetates from Waste Soda Liquors, &c., of which the following is a specification.

This invention relates especially to the treatment of waste liquor which is commonly known as black liquor produced especially when paper pulp is manufactured from wood, such as spruce, pine, hemlock, poplar or other deciduous woods, or from other similarly acting material, such as straw, flax, etc., by the caustic soda process. The waste soda liquor may with advantage be concentrated and have additional caustic soda added to it in some cases and then combined with fifty per cent. or so of caustic lime to form a solid causticized material to which process no broad claim is made in this case. This causticized material may be moderately heated and then cooled and extracted as with hot water to secure the acetate liquor which may be treated with carbon-dioxid to separate out the sodium bicarbonate which may be filtered out. The purified acetate liquor may be gently heated and then neutralized with acetic acid, for instance, whereupon the addition of caustic lime to the liquor effects a precipitation of coloring matter, etc., leaving a purified acetate solution which may be concentrated and crystallized, or acetates or acetic acid otherwise recovered therefrom.

In carrying out this process the soda waste liquor is preferably concentrated in multiple effect evaporators or the like so as to have a specific gravity of about 1.30 and caustic alkali, such as caustic soda, or potash, is then preferably added to the extent of about ten per cent. of the concentrated liquor and powdered caustic lime to the extent of about fifty per cent. of the liquor added and incorporated as by rapidly incorporating the lime with the preferably heated concentrated liquor so as to insure the violent reaction and elimination of considerable moisture forming a strong, porous, causticized, organic material known as caliginate. The violent reaction thus occurring apparently not only more or less causticizes the soda or other caustic alkali so that it can combine more effectively with some of the organic acid components, but also generates considerable heat and liberates steam in large quantities within the mass which apparently contributes to the strong porous condition of the final causticized material. This causticized material is preferably moderately heated in a closed container or retort to about 250 degrees centigrade which drives off the methyl alcohol and similar volatile components for condensation and recovery in suitable apparatus, without destructive distillation of the acetate material, the heat being preferably merely carried up sufficiently to decompose some of the lignin compounds while the acetate compounds are left substantially undisturbed. The heated charge is carefully cooled in the absence of air and is then extracted with hot water so as to secure a strong solution which may be as concentrated as thirty to thirty-two degrees Baumé, if desired, when suitable series percolating apparatus is used for extracting this crude acetate liquor.

This crude acetate liquor is then preferably treated with carbon-dioxid as by percolating therethrough either flue gases or the carbon-dioxid recovered, for instance, from the bicarbonate produced in the later stages of this process. This carbon-dioxid reacts with the acetate liquor to form considerable sodium bicarbonate from some of the soda compounds and this bicarbonate crystallizes out and may be readily separated from the liquor as by filter press methods leaving the resulting purified acetate liquor, the solids of which contain under commercial conditions about fifty per cent. of sodium acetate, twenty-five per cent. or so of lactonic or other kindred acids combined as sodium or potassium salts, ten per cent. or so of complex blackish coloring matter and five per cent. or so of sodium bicarbonate and ten per cent. or thereabout of sodium chlorid or the like which is usually present when electrolytic soda is originally added to the black liquor or used in its production. The sodium acetate is present in such large proportions as to represent as much as ten to twelve per cent. of the weight of the causticized organic material or calignate above referred to, this large proportion of acetate compounds being very possibly promoted by the gentle preliminary heating of the material and the prevention of subsequent undesirable oxidation of the acetic compounds thus formed. Possibly the splitting up of the pentosanes or hexosanes contained in the original black liquor into acetic groups may account more or less for this large proportion of acetates.

Free acid may be advantageously used to neutralize the sodium carbonate remaining in the purified acetate liquor and acetic acid is preferably used for this purpose to the extent of about one-third of the combined acetic acid present, that is, some six per cent. or so of the solids present in this purified acetate liquor. The coloring matters are also more or less neutralized in this way, although the lactonic acids are not greatly acted on because of their stronger chemical affinity. Alkali material, such as caustic lime to the extent of five per cent. or so of the solids in this liquor is then added thereto which combines with the coloring matter and largely precipitates it from the solution which is thus left substantially clear and by passing the material through a filter press these coloring compounds can be effectively separated out. The refined and filtered liquor may be advantageously concentrated to the highest suitable specific gravity as in any vacuum evaporating apparatus and the crystallization of the sodium acetate may be promoted as by adding crystals thereof so that the crystallized sodium acetate can be conveniently separated as in a centrifugal separator.

The remaining acetic acid which is combined in the resulting mother liquor may be recovered therefrom as by adding sulfuric acid to this liquor in sufficient quantities to displace the acetic acid from its combinations and then crystallizing out the sodium sulfate formed and distilling the liquor in an acetic acid still which drives off the acetic acid which may be, for example, recovered and re-used in the previous step of the process. The lactonic acids combined with the soda in the mother liquor may be recovered either as sodium compounds, or if desired, as lactonic and related acids if sufficient sulfuric acid is added at this final stage of the process to displace the lactonic acids which can then be separated after crystallizing out the sodium sulfate and concentrating the remaining liquor after which the lactonic and related acids may be purified in well known ways.

This invention has been described in connection with a number of illustrative ingredients, arrangements, conditions, apparatus, character and order of steps, to the details of which disclosure the invention is not of course limited.

What is claimed as new and what is desired to be secured by Letters Patent is set forth in the appended claims:

1. The process of treating the waste soda liquor produced in the manufacture of paper pulp from wood by the soda pulp process which comprises concentrating the waste liquor to a specific gravity of about 1.30 and incorporating about 10% of caustic soda and about 50% of powdered caustic lime to form strong porous causticized organic material and heating the same to about 250° C. and cooling in the absence of air, extracting the same with hot water to secure strong crude acetate liquor of about 30° Baume', percolating carbon-dioxid through said liquor to precipitate and remove sodium bicarbonate, adding acetic acid to the purified acetate liquor to the extent of about 6% of the solids therein to neutralize contained carbonate and incorporating powdered lime to the extent of about 5% of such solids and filtering, concentrating the filtrate and crystallizing sodium acetate therefrom and adding sulfuric acid to the resultant mother liquor and distilling acetic acid therefrom.

2. The process of treating the waste soda liquor produced in the manufacture of paper pulp from wood by the soda pulp process which comprises concentrating the waste liquor and incorporating about 50% of powdered caustic lime to form strong porous causticized organic material and heating the same to about 250° C. and cooling in the absence of air, extracting the same with hot water to secure strong crude acetate liquor of about 30° Baume', percolating carbon-dioxid through said liquor to precipitate and remove sodium bicarbonate, adding acetic acid to the purified acetate liquor to the extent of about 6% of the solids therein to neutralize contained carbonate and incorporating powdered lime to the extent of about 5% of such solids and filtering, concentrating the filtrate and crystallizing sodium acetate therefrom.

3. The process of treating the waste soda liquor produced in the manufacture of paper pulp from wood by the soda pulp process which comprises concentrating the waste liquor and incorporating about 50% of powdered caustic lime to form strong porous causticized organic material, extracting the same with water to secure strong crude acetate liquor, percolating carbon-dioxid through said liquor to precipitate and remove sodium bicarbonate, adding acetic acid to the purified acetate liquor to neutralize contained carbonate and incorporating powdered lime and filtering, concentrating the filtrate and crystallizing sodium acetate therefrom.

4. The process of treating the waste soda liquor produced in the manufacture of paper pulp from wood by the soda process which comprises concentrating the waste liquor to a specific gravity of about 1.30 and incorporating about 50% of powdered caustic lime to form porous masses of causticized organic material and heating the same to about 250° C. and cooling in the absence of air, extracting the same and forming a strong crude acetate liquor, percolating carbon-dioxid through said liquor to precipitate and remove sodium bicarbonate, adding to the purified acetate liquor and incorporating powdered lime solids and filtering, concentrating the filtrate and crystallizing sodium acetate therefrom and adding sulfuric acid to the resultant mother liquor and distilling acetic acid therefrom.

5. The process of treating the waste soda liquor produced in the manufacture of paper pulp from wood by the soda process which comprises concentrating the waste liquor and incorporating caustic lime to form porous masses of causticized organic material, extracting the same and forming a strong crude acetate liquor, percolating carbon-dioxid through said liquor to precipitate and remove sodium bicarbonate, adding to the purified acetate liquor and incorporating powdered lime solids and filtering, concentrating the filtrate and crystallizing sodium acetate therefrom.

6. The process of treating the waste soda liquor produced in the manufacture of paper pulp from wood by the soda process which comprises concentrating the waste liquor and incorporating caustic lime to form porous masses of causticized organic material, extracting the same and forming a strong crude acetate liquor, removing therefrom undesirable crystallizable material and crystallizing sodium acetate therefrom.

7. The process of treating the waste soda liquor produced in the manufacture of cellulose from wood by the soda process which comprises concentrating and causticizing with quicklime the waste liquor to form porous masses of causticized organic material, heating the same to about 250° C. and cooling in the absence of air to promote production of acetate material, forming therefrom strong crude acetate liquor of about 30° Baumé, percolating carbon-dioxid through said liquor to precipitate and remove sodium bicarbonate, adding acetic acid to the purified acetate liquor to convert alkali salts into acetates.

8. The process of treating the waste soda liquor produced in the manufacture of cellulose from vegetable fiber material by the soda process which comprises concentrating and causticizing with quicklime the waste liquor to form porous masses of causticized organic material, heating the same and cooling in the absence of air to promote production of acetate material, forming therefrom strong crude acetate liquor, percolating carbon-dioxid through said liquor to precipitate and remove sodium bicarbonate and crystallizing sodium acetate therefrom.

9. The process of treating the waste soda liquor produced in the manufacture of cellulose from vegetable fiber material by the soda process which comprises concentrating and causticizing with quicklime the waste liquor to form porous masses of causticized organic material, and forming therefrom strong crude acetate liquor.

10. The process of treating the waste soda liquor produced in the manufacture of cellulose from vegetable fiber material by the soda process which comprises concentrating and causticizing with quicklime the waste liquor to form porous masses of causticized organic material, forming therefrom strong crude acetate liquor, and adding acetic acid to the acetate liquor to convert undesirable alkali salts into acetates.

11. The process of treating the waste soda liquor produced in the manufacture of cellulose from vegetable fiber material by the soda process which comprises concentrating and causticizing with quicklime the waste liquor to form porous masses of causticized organic material and heating the same to about 250° C. and cooling in the absence of air to promote production of acetate material, and forming therefrom crude acetate liquor.

12. The process of producing acetates from the waste soda liquor produced in the manufacture of cellulose from vegetable fiber material by the soda process which comprises forming therefrom crude acetate liquor, and adding acetic acid to the acetate liquor to convert undesirable alkali salts into acetates.

VIGGO DREWSEN.

Witnesses:
 HARRY L. DUNCAN,
 JESSIE B. KAY.